United States Patent
Hjärn et al.

(10) Patent No.: US 11,397,268 B2
(45) Date of Patent: Jul. 26, 2022

(54) EDGE-ON X-RAY DETECTOR

(71) Applicant: Prismatic Sensors AB, Stockholm (SE)

(72) Inventors: Torbjörn Hjärn, Vaxholm (SE); Hans Bornefalk, Vallentuna (SE); Martin Sjölin, Stockholm (SE)

(73) Assignee: PRISMATIC SENSORS AB, Stockholm (SE)

( * ) Notice: Subject to any disclaimer, the term of this patent is extended or adjusted under 35 U.S.C. 154(b) by 0 days.

(21) Appl. No.: 17/237,460

(22) Filed: Apr. 22, 2021

(65) Prior Publication Data

US 2021/0278554 A1 Sep. 9, 2021

Related U.S. Application Data

(63) Continuation of application No. 16/808,903, filed on Mar. 4, 2020, now Pat. No. 11,086,032.

(51) Int. Cl.
G01T 1/24 (2006.01)
(52) U.S. Cl.
CPC ............. G01T 1/244 (2013.01); G01T 1/243 (2013.01)
(58) Field of Classification Search
CPC .................. G01T 1/243; G01T 1/244
See application file for complete search history.

(56) References Cited

U.S. PATENT DOCUMENTS

| | | |
|---|---|---|
| 6,298,113 B1 | 10/2001 | Duclos et al. |
| 2002/0181647 A1 | 12/2002 | Venkataramani et al. |
| 2006/0165214 A1 | 7/2006 | Mattson et al. |
| 2006/0192308 A1 | 8/2006 | Juni |
| 2010/0320391 A1 | 12/2010 | Antonuk |
| 2018/0172847 A1 | 6/2018 | Nelson et al. |
| 2018/0321394 A1 | 11/2018 | Danielsson et al. |
| 2019/0227182 A1 | 7/2019 | Ergler et al. |

OTHER PUBLICATIONS

International Search Report and Written Opinion of the ISA for PCT/SE2020/050241 dated Aug. 26, 2020, 13 pages.

*Primary Examiner* — David P Porta
*Assistant Examiner* — Fani Polyzos Boosalis
(74) *Attorney, Agent, or Firm* — Nixon & Vanderhye

(57) ABSTRACT

There is provided an edge-on x-ray detector configured for detecting incoming x-rays. The edge-on x-ray detector includes a plurality of adjacent x-ray sensors, and each x-ray sensor is oriented edge-on to incoming x-rays. The x-ray sensors are arranged side-by-side and/or lined up one after the other, and the interspacing between the x-ray sensors is at least partly filled with a gap filling material including a mixture or compound of resin and metal disulfide.

18 Claims, 20 Drawing Sheets

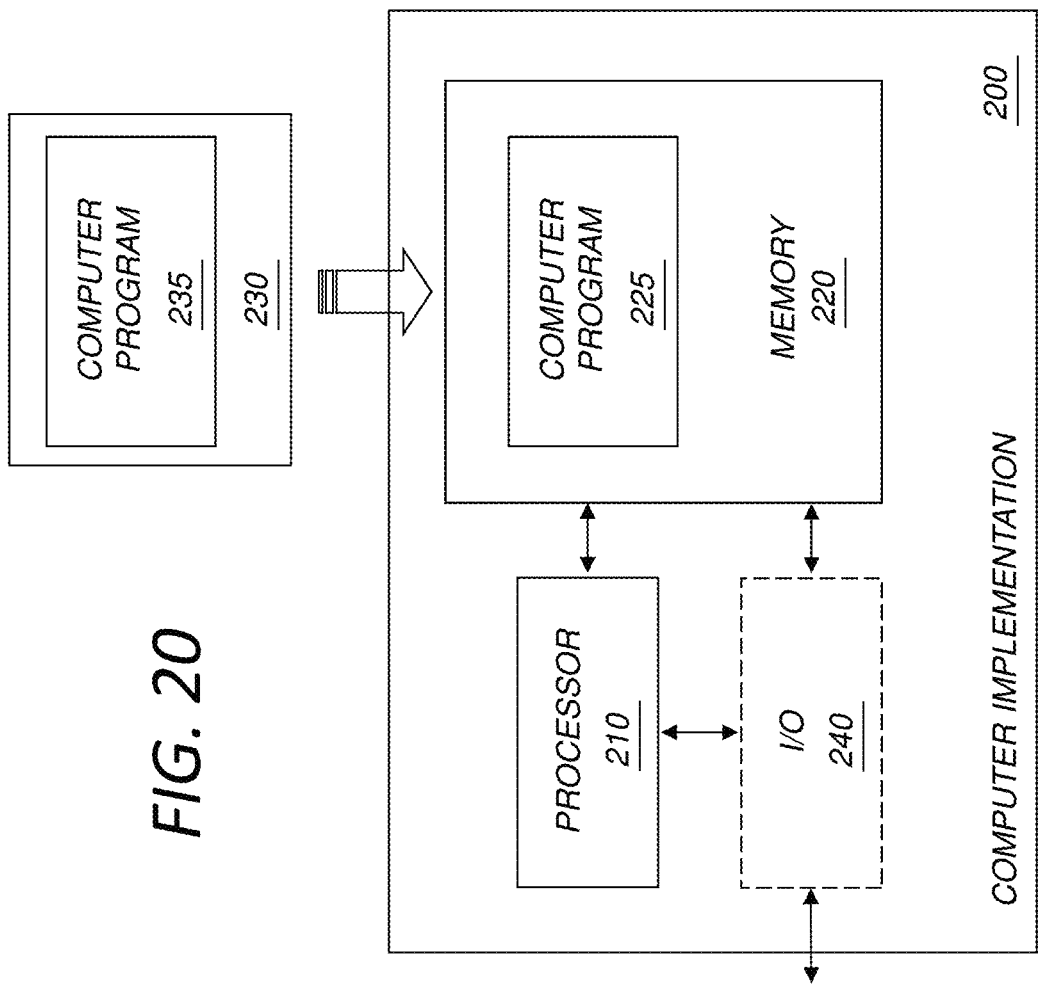

EDGE-ON X-RAY DETECTOR

CROSS-REFERENCE TO RELATED APPLICATION

This application is a continuation of U.S. patent application Ser. No. 16/808,903 filed on Mar. 4, 2020, the contents of which are hereby incorporated by reference.

The project leading to this application has received funding from the European Union's Horizon 2020 research and innovation programme under grant agreement No 830294.

TECHNICAL FIELD

The proposed technology relates to x-ray imaging, and more particularly to x-ray detectors as well as x-ray imaging systems.

BACKGROUND

Radiographic imaging such as x-ray imaging has been used for years in medical applications and for non-destructive testing.

Normally, an x-ray imaging system includes an x-ray source and an x-ray detector system. The x-ray source emits x-rays, which pass through a subject or object to be imaged and are then registered by the x-ray detector system. Since some materials absorb a larger fraction of the x-rays than others, an image is formed of the subject or object.

In order to increase the absorption efficiency, the x-ray detector may be arranged edge-on to the incoming or incident x-rays, in which case the absorption depth can be chosen to any length and the detector can still be fully depleted without going to very high voltages.

Edge-on is thus a special design, where the x-ray sensors are oriented edge-on to incoming x-rays. This type of detector may, by design, have x-ray sensors and/or detector elements with a so-called high aspect ratio, i.e. a relatively high ratio between the length (or depth) of the x-ray sensors and/or detector elements in the direction of the incident x-rays and the width of the x-ray sensors and/or detector elements in a substantially perpendicular direction.

Although edge-on x-ray detectors have many advantageous features, a drawback with high aspect x-ray sensors and/or detector elements thereof is the sensitivity to dynamic misalignments with respect to the focal spot of the x-ray source. Dynamic misalignment is a technical reality, which is non-trivial to eliminate. The effects of dynamic misalignment may be clinically unacceptable image artefacts and/or other image quality problems.

There is thus a need for a technical solution mitigating the effects of dynamic alignments in edge-on x-ray detectors.

SUMMARY

It is a general object to provide improvements related to x-ray detectors and/or x-ray imaging systems.

For example, it is desirable for an x-ray detector to be more robust to dynamic misalignment or to provide a technical solution that at least reduces the sensitivity to such dynamic misalignments.

It is a specific object to provide an edge-on x-ray detector configured for detecting incoming x-rays.

It is also an object to provide an x-ray imaging system comprising such an x-ray detector.

These and other objects may be achieved by one or more embodiments of the proposed technology.

According to a first aspect, there is provided an edge-on x-ray detector configured for detecting incoming x-rays. The edge-on x-ray detector comprises a plurality of adjacent x-ray sensors, wherein each x-ray sensor is oriented edge-on to incoming x-rays. The x-ray sensors are arranged side-by-side and/or lined up one after the other, and the interspacing between the x-ray sensors is at least partly filled with a gap filling material comprising a mixture or compound of resin and metal disulfide.

By way of example, although various metal disulfides may be used, it has been shown that a beneficial choice of metal disulfide for the gap filling mixture or compound is tungsten disulfide. For example, the resin may be mixed with tungsten disulfide powder.

In this way, the edge-on x-ray detector may become more robust to dynamic misalignments. In particular, so-called high aspect ratio x-ray sensors and/or detector elements may be less sensitive to dynamic misalignments with respect to the focal point of the x-ray source. This in turn may lead to improved image quality. In particular, it may be possible to more or less eliminate certain image artefacts, e.g. in clinical Computed Tomography (CT) applications.

According to a second aspect, there is provided an x-ray imaging system including such an edge-on x-ray detector.

Expressed slightly differently, according to a third aspect, the proposed technology provides an edge-on x-ray detector configured for detecting incoming x-rays, which comprises a plurality of adjacent x-ray detector sub-modules, wherein each x-ray detector sub-module is oriented edge-on to incoming x-rays. The x-ray detector sub-modules are arranged side-by-side and/or lined up one after the other, and the interspacing between the x-ray detector sub-modules is at least partly filled with a material comprising a metal disulfide mixed into a synthetic or organic resin or compound.

Other advantages will be appreciated when reading the detailed description.

BRIEF DESCRIPTION OF DRAWINGS

FIG. 20 is a schematic diagram illustrating an example of a computer implementation according to an embodiment.

DETAILED DESCRIPTION

Figure 1:
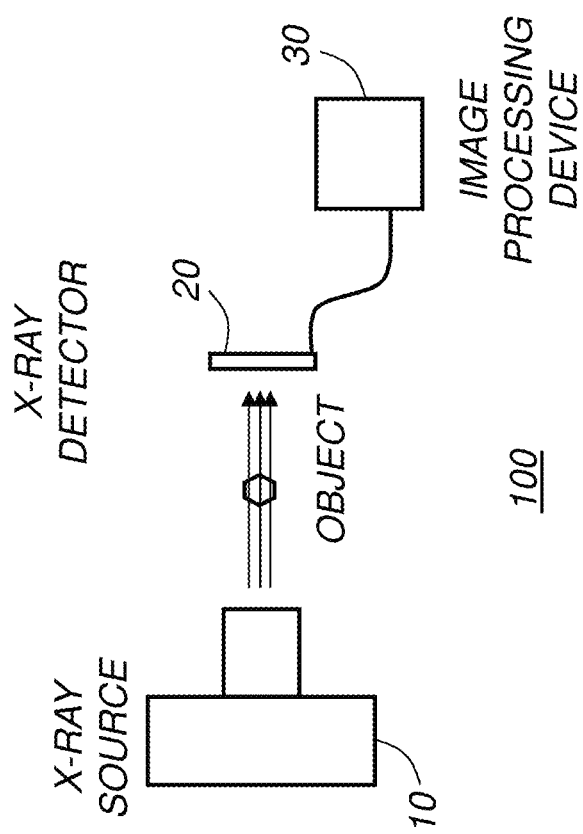
FIG. 1 is a schematic diagram illustrating an example of an overall x-ray imaging system.

It may be useful to begin with a brief overview of an illustrative overall x-ray imaging system, with reference to FIG. 1. In this non-limiting example, the x-ray imaging system 100 basically comprises an x-ray source 10, an x-ray detector system 20 and an associated image processing device 30. In general, the x-ray detector system 20 is configured for registering radiation from the x-ray source 10 that may have been focused by optional x-ray optics and passed an object or subject or part thereof. The x-ray detector system 20 is connectable to the image processing device 30 via suitable analog processing and read-out electronics (which may be integrated in the x-ray detector system 20) to enable image processing and/or image reconstruction by the image processing device 30.

Figure 2:
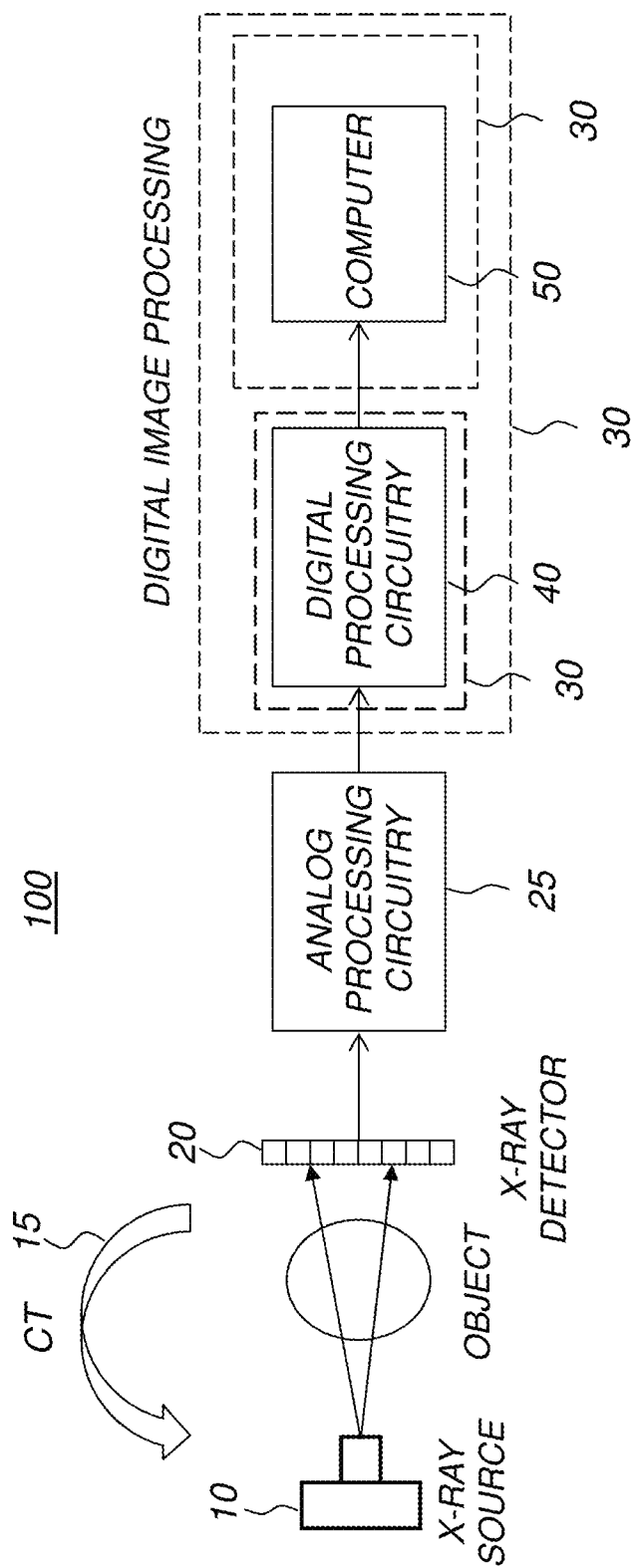
FIG. 2 is a schematic diagram illustrating another example of an x-ray imaging system.

FIG. 2 is a schematic diagram illustrating an example of an x-ray imaging system 100 comprises an x-ray source 10, which emits x-rays; an x-ray detector system 20, which detects the x-rays after they have passed through the object; analog processing circuitry 25, which processes the raw electrical signal from the detector and digitizes it; digital processing circuitry 40 which may carry out further processing operations on the measured data such as applying corrections, storing it temporarily, or filtering; and a computer 50 which stores the processed data and may perform further post-processing and/or image reconstruction.

The overall detector may be regarded as the x-ray detector system 20, or the x-ray detector system 20 combined with the associated analog processing circuitry 25.

The digital part including the digital processing circuitry 40 and/or the computer 50 may be regarded as a digital image processing system 30, which performs image reconstruction based on the image data from the x-ray detector. The image processing system 30 may thus be seen as the computer 50, or alternatively the combined system of the digital processing circuitry 40 and the computer 50, or possibly the digital processing circuitry 40 by itself if the digital processing circuitry is further specialized also for image processing and/or reconstruction.

An example of a commonly used x-ray imaging system is a Computed Tomography (CT) system, which may include an x-ray source that produces a fan or cone beam of x-rays and an opposing x-ray detector system for registering the fraction of x-rays that are transmitted through a patient or object. The x-ray source and detector system are normally mounted in a gantry that rotates around the imaged object.

Accordingly, the x-ray source 10 and the x-ray detector system 20 illustrated in FIG. 1 and FIG. 2 may thus be arranged as part of a CT system, e.g. mountable in a CT gantry.

Figure 3:
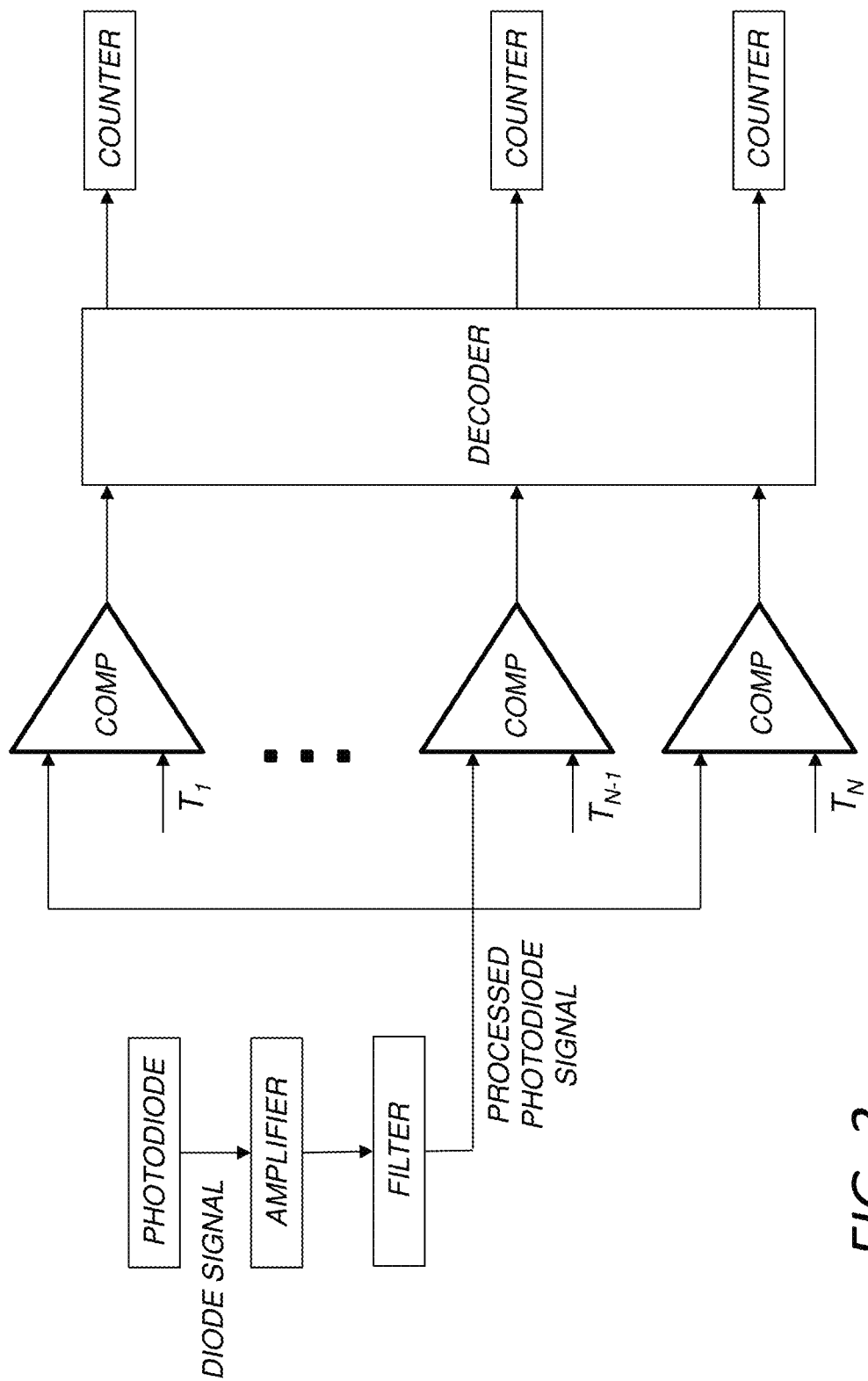
FIG. 3 is a schematic block diagram of a CT system as an illustrative example of an X-ray imaging system.

FIG. 3 is a schematic block diagram of a CT system as an illustrative example of an x-ray imaging system. The CT system comprises a computer 50 receiving commands and scanning parameters from an operator via an operator console 60 that may have has a display and some form of operator interface, e.g., keyboard and mouse. The operator supplied commands and parameters are then used by the computer 50 to provide control signals to an x-ray controller 41, a gantry controller 42 and a table controller 43. To be specific, the x-ray controller 41 provides power and timing signals to the x-ray source 10 to control emission of x-rays onto the object or patient lying on the table 12. The gantry controller 42 controls the rotational speed and position of the gantry 11 comprising the x-ray source 10 and the x-ray detector 20. The table controller 43 controls and determines the position of the patient table 12 and the scanning coverage of the patient. There is also a detector controller 44, which is configured for controlling and/or receiving data from the detector 20.

In an embodiment, the computer 50 also performs post-processing and image reconstruction of the image data output from the x-ray detector. The computer thereby corresponds to the image processing system 30 as shown in FIGS. 1 and 2. The associated display allows the operator to observe the reconstructed images and other data from the computer.

The x-ray source 10 arranged in the gantry 11 emits x-rays. An x-ray detector 20, e.g. in the form of an edge-on x-ray detector, detects the x-rays after they have passed through the patient. The x-ray detector 20 may for example have a plurality of pixels, also referred to as sensors or detector elements, and the associated processing circuitry, such as ASICs, arranged in detector modules. At least a portion of the analog processing part may be implemented in the pixels, whereas any remaining processing part is implemented in, for instance, the ASICs. In an embodiment, the processing circuitry (ASICs) digitizes the analog signals from the pixels. The processing circuitry (ASICs) may also comprise a digital processing part, which may carry out further processing operations on the measured data, such as applying corrections, storing it temporarily, and/or filtering. During a scan to acquire x-ray projection data, the gantry and the components mounted thereon rotate about an isocenter.

A challenge for x-ray imaging detectors is to extract maximum information from the detected x-rays to provide input to an image of an object or subject where the object or subject is depicted in terms of density, composition and structure. It is still common to use film-screen as detector but most commonly the detectors today provide a digital image.

Modern x-ray detectors normally need to convert the incident x-rays into electrons, this typically takes place through photo absorption or through Compton interaction and the resulting electrons are usually creating secondary visible light until its energy is lost and this light is in turn detected by a photo-sensitive material. There are also detectors, which are based on semiconductors and in this case the electrons created by the x-ray are creating electric charge in terms of electron-hole pairs which are collected through an applied electric field.

Conventional x-ray detectors are energy integrating, the contribution from each detected photon to the detected signal is therefore proportional to its energy, and in conventional CT, measurements are acquired for a single energy distribution. The images produced by a conventional CT system therefore have a certain look, where different tissues and materials show typical values in certain ranges.

There are detectors operating in an integrating mode in the sense that they provide an integrated signal from a multitude of x-rays and the signal is only later digitized to retrieve a best guess of the number of incident x-rays in a pixel.

However, photon counting detectors have emerged as a feasible alternative in some applications; currently those detectors are commercially available mainly in mammography. The photon counting detectors have an advantage since in principle the energy for each x-ray can be measured which yields additional information about the composition of the object. This information can be used to increase the image quality and/or to decrease the radiation dose.

Figure 4:
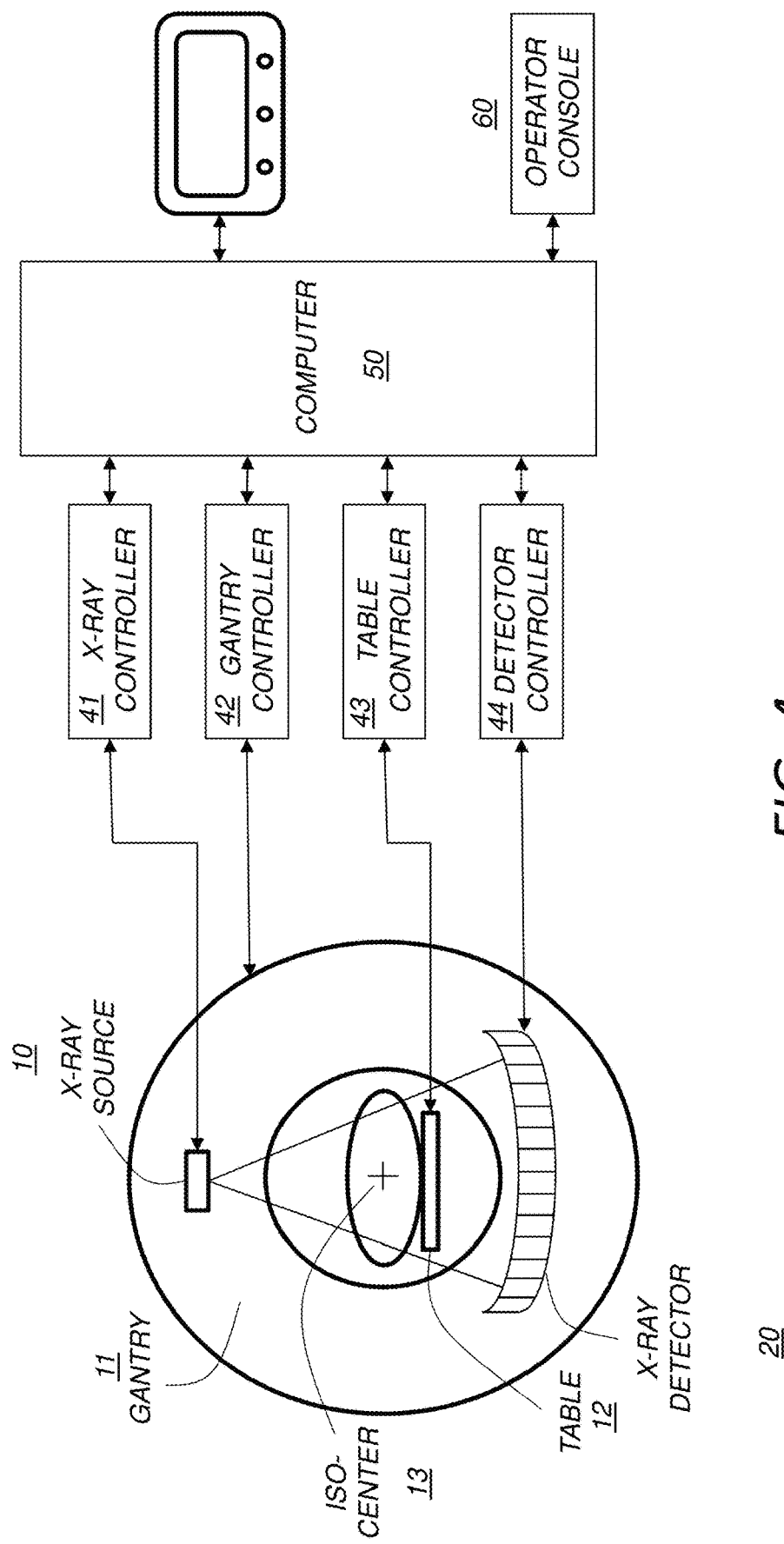
FIG. 4 is a schematic diagram illustrating an example of the conceptual structure for implementing an energy-discriminating photon-counting detector.

A further improvement relates to the development of so-called energy-discriminating photon-counting detectors, e.g. as schematically illustrated in FIG. 4. In this type of x-ray detectors, each registered photon generates a current pulse which is compared to a set of thresholds, thereby counting the number of photons incident in each of a number of so-called energy bins. This may be very useful in the image reconstruction process. Sometimes, an energy-discriminating photon-counting detector may be referred to as a multi-bin detector.

In general, the energy information allows for new kinds of images to be created, where new information is available and image artifacts inherent to conventional technology can be removed.

In other words, for an energy-discriminating detector, the pulse heights are compared to a number of programmable thresholds in the comparators and classified according to pulse-height, which in turn is proportional to energy.

However, an inherent problem in any (charge sensitive) amplifier is that it will add electronic noise to the detected current. In order to avoid detecting noise instead of real x-ray photons, it is therefore important to set the lowest threshold value (Thr) high enough so that the number of times the noise value exceeds the threshold value is low enough not to disturb the detection of x-ray photons.

By setting the lowest threshold above the noise floor, electronic noise, which is the major obstacle in the reduction of radiation dose of the x-ray imaging systems, can be significantly reduced The (shaping) filter has the general property that large values of the shaping time will lead to a long pulse caused by the x-ray photon and reduce the noise amplitude after the filter. Small values of the shaping time will lead to a short pulse and a larger noise amplitude. Therefore, in order to count as many x-ray photons as possible, a large shaping time is desired to minimize noise and allowing the use of a relatively small threshold level.

As previously mentioned, in order to increase the absorption efficiency, the x-ray detector can be arranged edge-on, in which case the absorption depth can be chosen to any length and the detector can still be fully depleted without going to very high voltages.

Edge-on is thus a special design, where the x-ray sensors are oriented edge-on to incoming x-rays.

For example, such an edge-on x-ray detector may have pixels or detector elements in at least two directions, wherein one of the directions of the edge-on detector has a component in the direction of the X-rays. Such an edge-on x-ray detector is sometimes referred to as a depth-segmented x-ray detector, having two or more depth segments of detector elements in the direction of the incoming X-rays.

Alternatively, the detector elements may be arranged as an array (non-depth-segmented) in a direction substantially orthogonal to the direction of the incident x-rays, and each of the detector elements may be oriented edge-on to the incident x-rays. In other words, the x-ray detector may be non-depth-segmented, while still arranged edge-on to the incoming x-rays.

Figure 5:
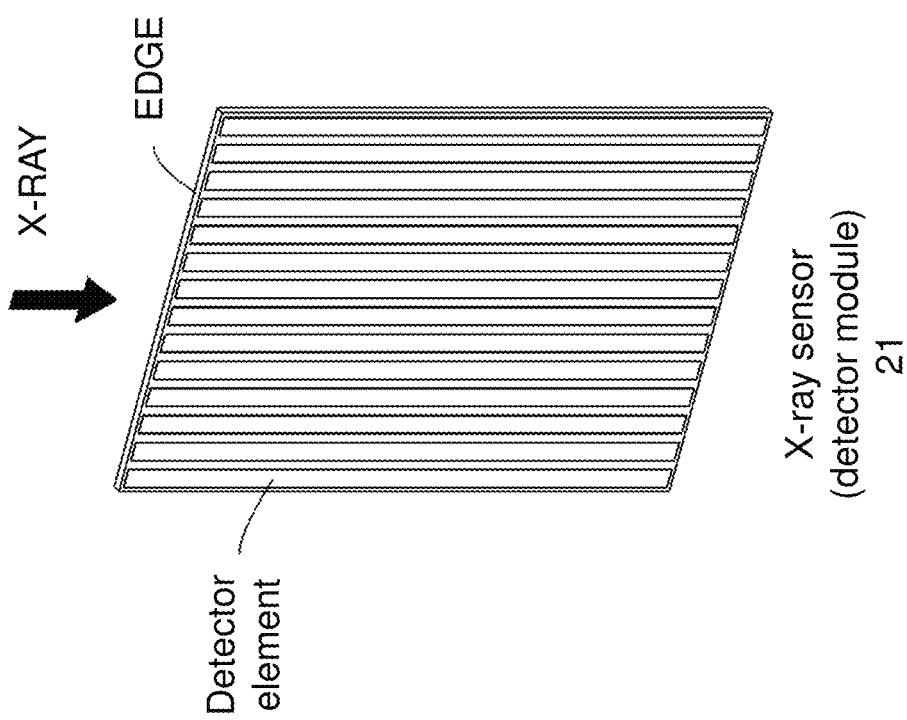
FIG. 5 is a schematic diagram illustrating an example of a semiconductor detector sub-module according to an exemplary embodiment.

FIG. 5 is a schematic diagram illustrating an example of an edge-on x-ray sensor 21, also referred to as a detector module or sub-module, according to an exemplary embodiment. This is an example of an x-ray sensor 21 or detector sub-module with the sensor part split into detector elements or pixels, where each detector element (or pixel) is normally based on a diode having a charge collecting electrode as a key component. The x-rays enter through the edge of the x-ray sensor.

Figure 6:
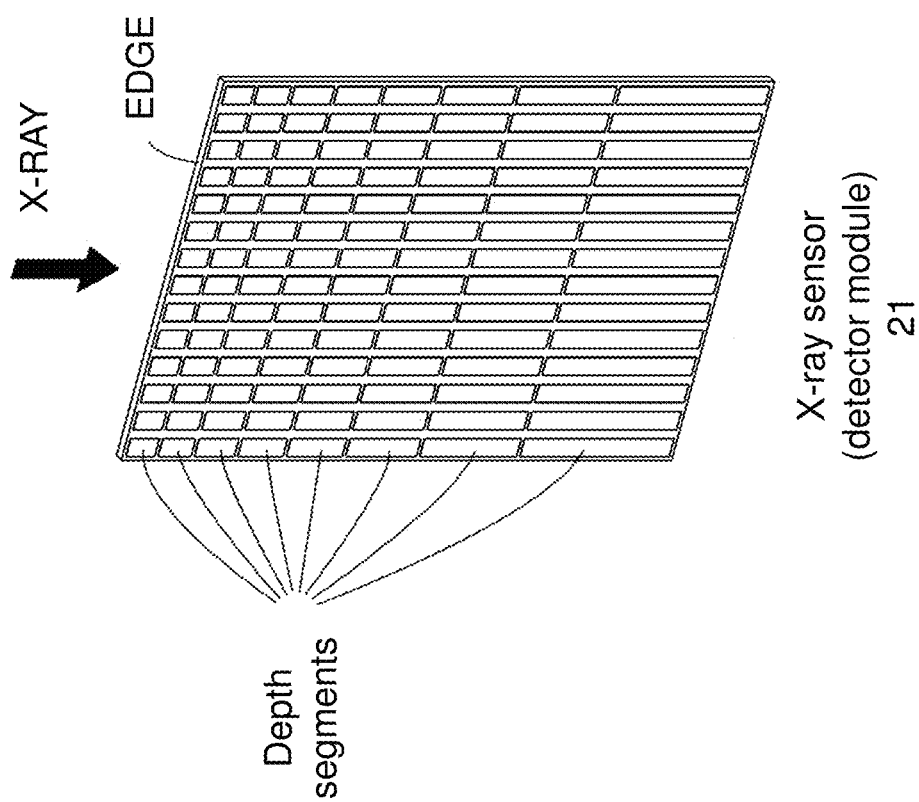
FIG. 6 is a schematic diagram illustrating an example of semiconductor detector sub-module according to another exemplary embodiment.

FIG. 6 is a schematic diagram illustrating an example of an edge-on x-ray sensor 21, or detector sub-module, according to another exemplary embodiment. In this example, the sensor part is further split into so-called depth segments in the depth direction, again assuming the x-rays enter through the edge.

Normally, a detector element is an individual x-ray sensitive sub-element of the detector. In general, the photon interaction takes place in a detector element and the thus generated charge is collected by the corresponding electrode of the detector element.

Each detector element typically measures the incident x-ray flux as a sequence of frames. A frame is the measured data during a specified time interval, called frame time.

Depending on the detector topology, a detector element may correspond to a pixel, especially when the detector is a flat-panel detector. A depth-segmented detector may be regarded as having a number of detector strips, each strip having a number of depth segments. For such a depth-segmented detector, each depth segment may also be regarded as an individual detector element, especially if each of the depth segments is associated with its own individual charge collecting electrode.

The detector strips of a depth-segmented detector normally correspond to the pixels of an ordinary flat-panel detector, and therefore sometimes also referred to as pixel strips. However, it is also possible to regard a depth-segmented detector as a three-dimensional pixel array, where each pixel (sometimes referred to as a voxel) corresponds to an individual depth segment/detector element.

By way of example, the sensors may be implemented as so called Multi-Chip Modules (MCMs) in the sense that the semiconductor sensors are used as base substrates for electric routing and for a number of Application Specific Integrated Circuits (ASICs) which are attached preferably through so called flip-chip technique. The routing will include a connection for the signal from each pixel or detector element to the ASIC input as well as connections from the ASIC to external memory and/or digital data processing. Power to the ASICs may be provided through similar routing taking into account the increase in cross-section which is required for the large currents in these connections, but the power may also be provided through a separate connection.

Figure 7:
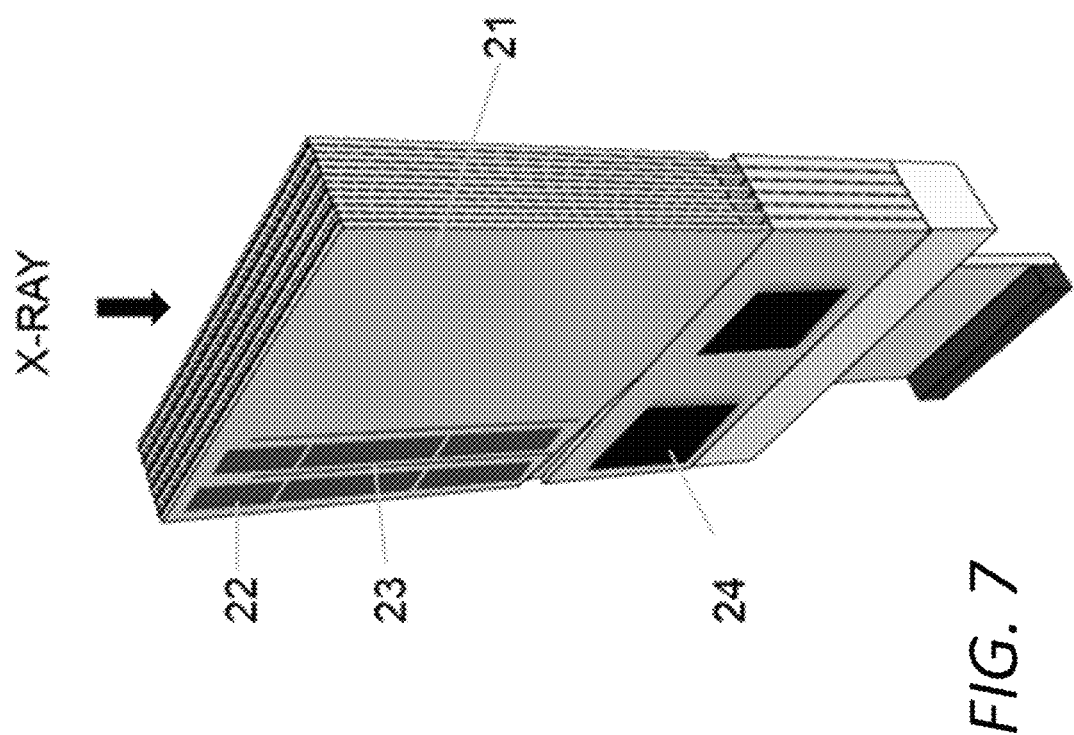
FIG. 7 is a schematic diagram illustrating an example of an x-ray detector comprising a set of tiled x-ray sensors or detector sub-modules.

FIG. 7 is a schematic diagram illustrating an example of an x-ray detector 20 comprising a set of tiled x-ray sensors, 21, also referred to as x-ray detector sub-modules, where each x-ray sensor or detector sub-module 21 is a depth-segmented edge-on x-ray sensor or detector sub-module and the ASICs or corresponding circuitry 24 are arranged below the detector elements 22 as seen from the direction of the incoming x-rays, allowing for routing paths 23 from the detector elements 22 to the ASICs 24 in the space between detector elements.

As previously mentioned, a drawback with high aspect detector elements such as those of edge-on x-ray detectors is the sensitivity to dynamic misalignments with respect to the focal spot of the x-ray source. Dynamic misalignment is a technical reality, which is non-trivial to eliminate. The effects of dynamic misalignment may be clinically unacceptable image artefacts and/or other image quality problems.

There is thus a need for a technical solution mitigating the effects of dynamic alignments in edge-on x-ray detectors.

For a better understanding, an illustrative problem scenario will be discussed in more detail below.

By way of example, photon counting multi-bin detectors have the capability to partition the incident photons of a broad spectrum into several bins based on their deposited energy. This is typically done by pulse-height comparators (e.g. once again see FIG. 3) acting on an analogue signal with an amplitude proportional to the charge liberated by the x-ray in the semi-conductor material of the detector.

Benefits of using photon-counting multi-bin detectors in Computed Tomography applications include elimination of beam hardening artifacts, material quantification and the possibility to generate images with improved contrast to noise ratio by means of generating synthetic monoenergetic images. These benefits are typically obtained by material basis decomposition. Often material basis decomposition is performed in the projection domain i.e. applied to the raw photon counts in every single projection. In short, the goal for such a decomposition is to use the counts in each projection and estimate the corresponding pathlengths of a set of basis materials. These pathlengths estimate are later used for image reconstruction.

A pre-requisite for performing material basis decomposition is accurate knowledge of the system. This knowledge is typically captured in a forward model, describing the expected response (counts in each bin) for all feasible combinations of basis material pathlengths. Material basis decomposition amounts to inverting the forward model using noisy x-ray realizations (detected counts in the bins) and estimated corresponding pathlengths. One possible method to do this is to use the maximum likelihood method.

The larger the aspect ratio of individual detector elements, i.e. ratio between the length in the direction of the incident x-rays and the length in a perpendicular direction, the more sensitive the detector becomes to dynamic misalignment of the detector elements and the focal spot source.

Figure 8:
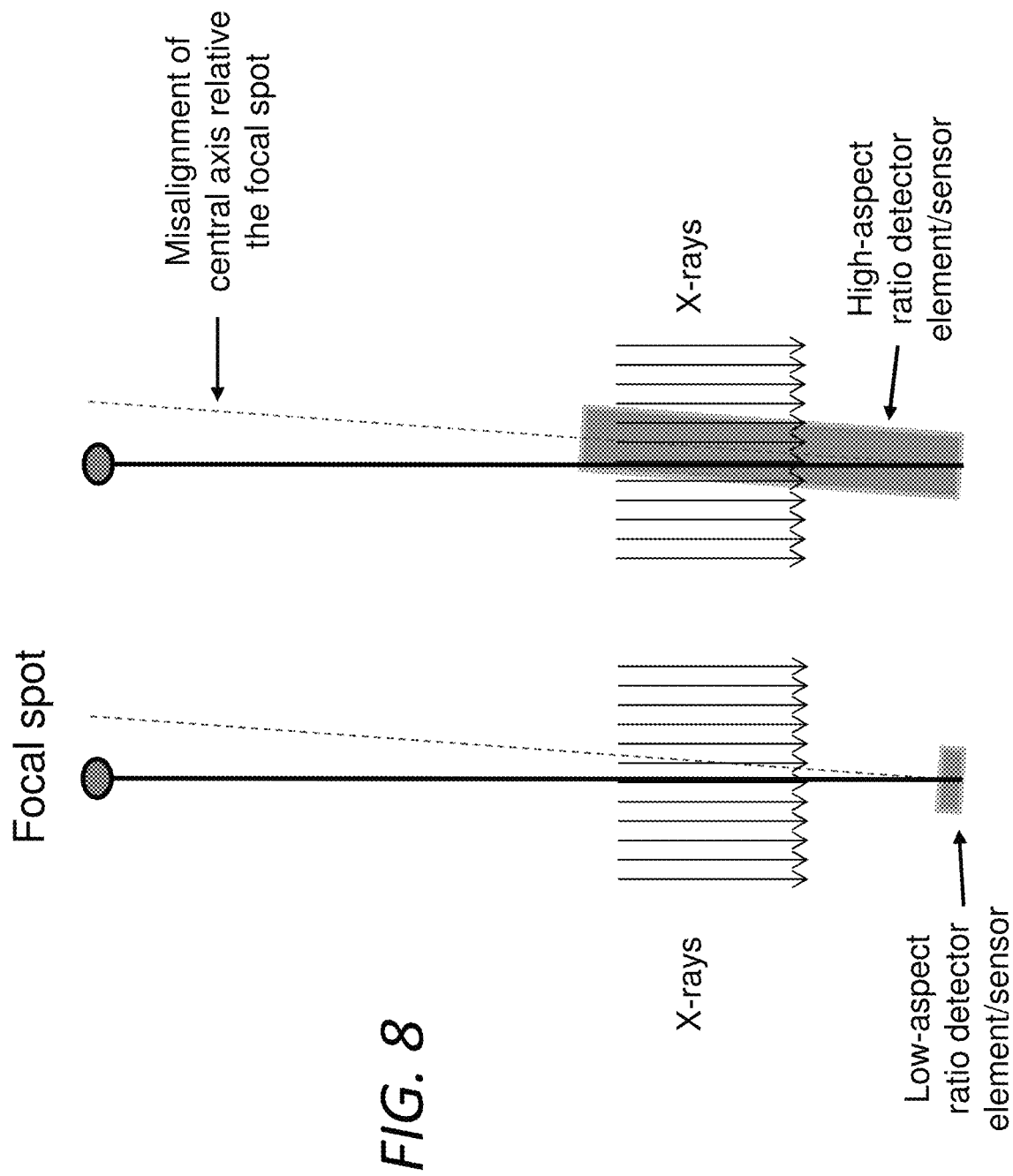
FIG. 8 is a schematic diagram illustrating an example of misalignment of the central axis of an x-ray sensor and/or detector element relative the focal spot of an associated x-ray source.

With dynamic misalignment we refer to a displacement of the center axis of an x-ray sensor and/or detector element relative the focal spot source, cf. FIG. 8. There are many sources for such movements, including thermal expansion, rotational forces and focal spot movement and they will be elaborated on below. It is important to already here comment on the possible effect of such movements; if severe, they can make the forward model invalid. If, for example, the calibration data for a certain x-ray sensor and/or detector element was obtained with the sensor axis pointing towards the focal spot, the determined forward model will only be exact for this alignment. If misalignment causes x-rays to enter an x-ray sensor and/or detector element with large aspect ratio at an angle, both the number of photons interacting and the energies they deposit may differ since the attenuation lengths through the active detector material vary greatly for x-rays that hit the x-ray sensor and/or detector element at the slanted edge. While x-rays also hit a misaligned x-ray sensor and/or detector element with small aspect ratio at the slanted edge, the fraction of x-rays hitting the edge increases with aspect ratio as evident from FIG. 8. If the difference in number of photons interacting, and their energy, is large enough a forward model determined during correct alignment will not be accurate enough to perform material basis decomposition without bias.

Figure 9:
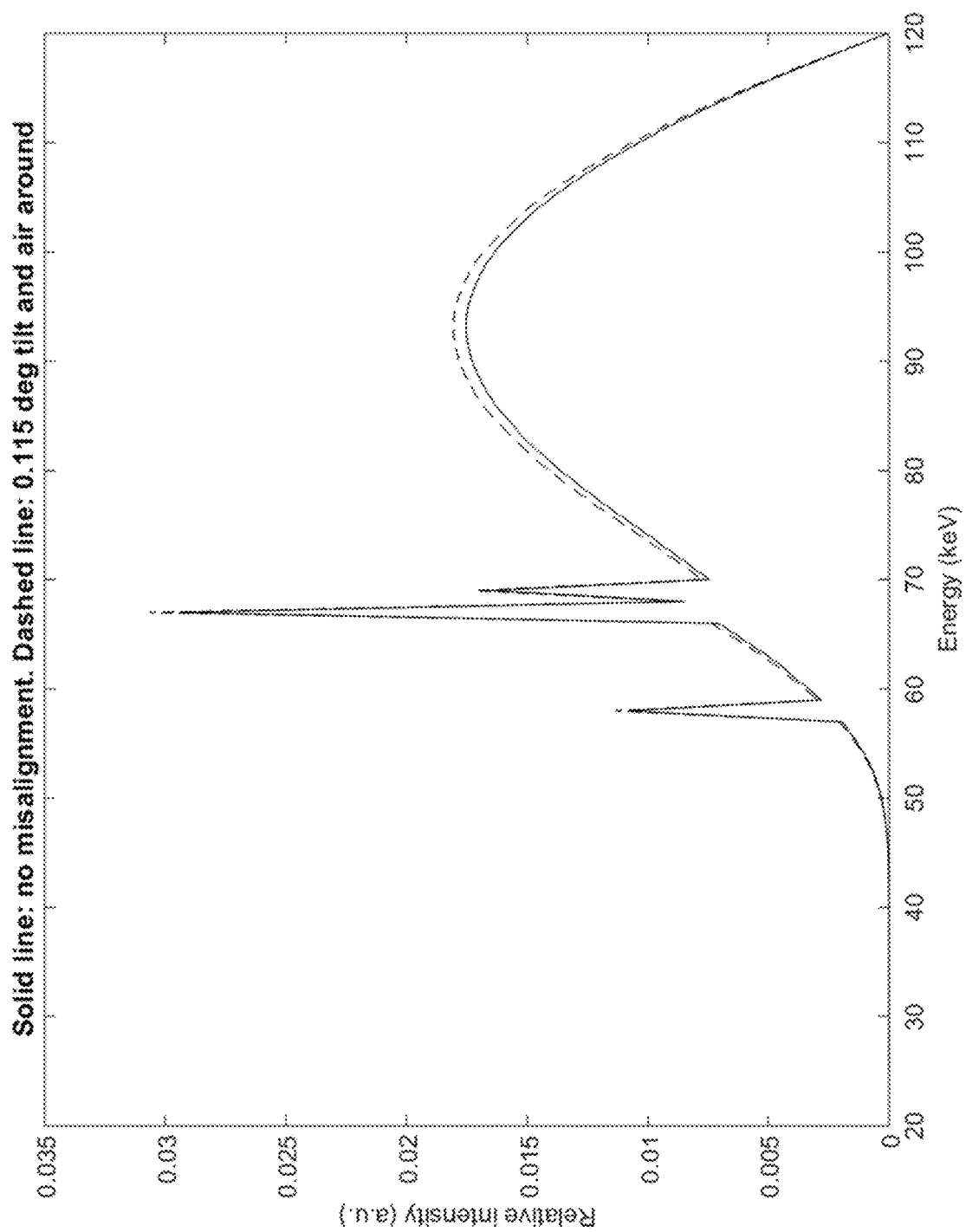
FIG. 9 is a schematic curve diagram illustrating an example of a situation where more photons would interact in a misaligned x-ray sensor and/or detector element compared to a non-misaligned case.

A more thorough understanding as to why the energies of the interacting photons differ in the two cases is given by the exponential transmission described by the Beer-Lambert law. Even though the illuminated x-ray sensor and/or detector element volumes (cf. FIG. 8) do not change with misalignment angle, the pathlengths will differ. A larger fraction of the x-ray sensor and/or detector element will only generate counts from x-rays that have traversed a short distance, and therefore more low-energy photons will interact compared to the case of no misalignment. Similarly, the fraction the x-rays that traverse a distance corresponding to the full detector length is smaller in the case of misalignment, and this will result in relatively fewer high-energy photons interacting. The effect can be sizeable as illustrated by means of simulation, results of which can be seen in FIG. 9. The simulation parameters, although merely intended to be illustrative and non-limiting, are based on a silicon strip detector with a width of 650 μm and height of 37 mm, yielding an aspect ratio of 57. The misalignment corresponds to an exaggerated tilt angle of 0.115°. It is clear that the spectrum of interacting photons is changed and in total 3.2% more photons would interact in a misaligned x-ray sensor (dashed line) and/or detector element compared to a non-misaligned case (solid line).

Figure 10:
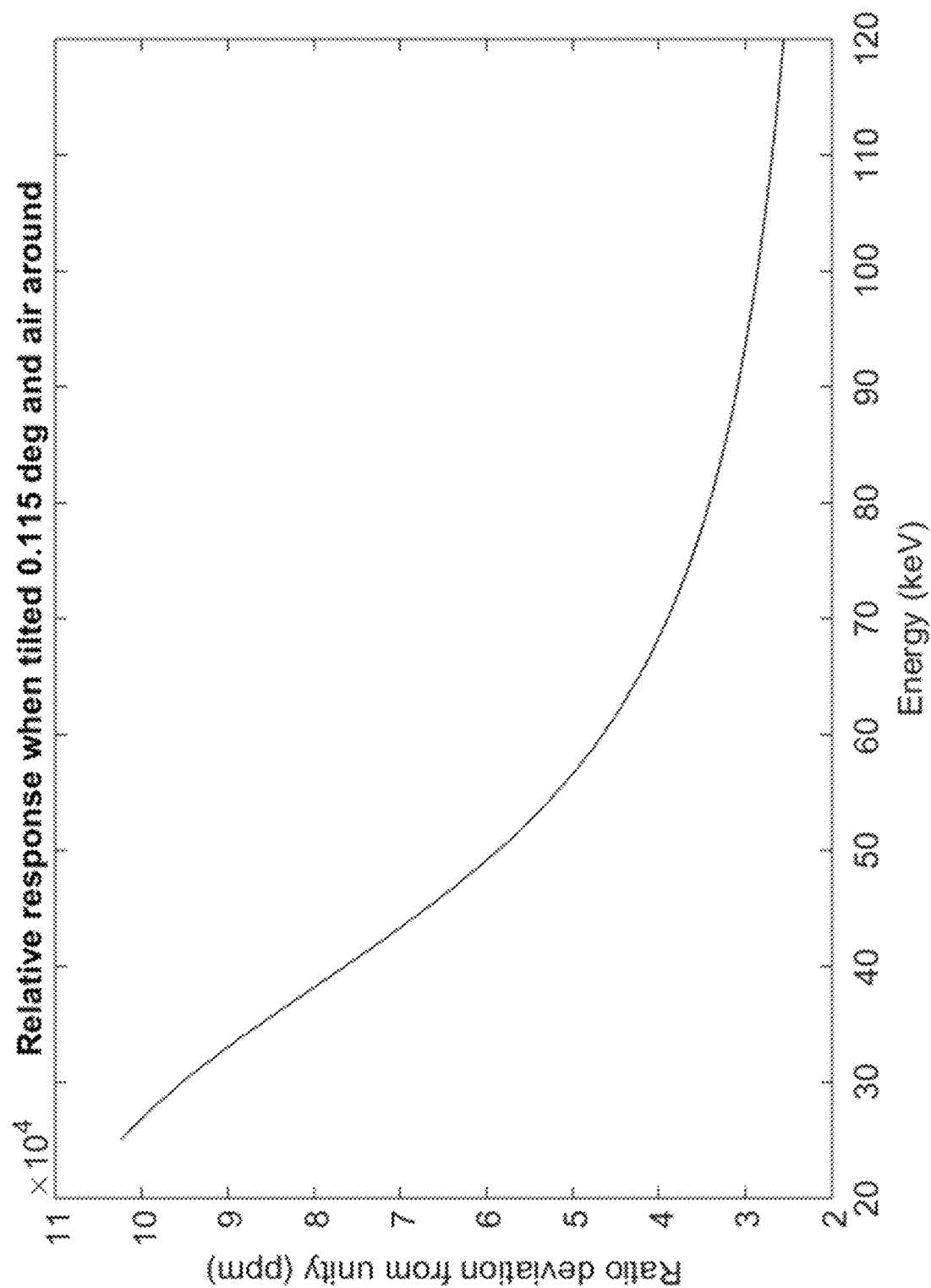
FIG. 10 is a schematic curve diagram illustrating an example of the relative difference as a function of energy, showing a situation where the spectrum of interacting photons is shifted towards the low energy side.

In FIG. 10, the relative difference as a function of energy is depicted. It shows that the spectrum of interacting photons is shifted towards the low energy side.

Thus far we have shown that dynamic misalignment might cause biased material pathlength estimates if, for example, the focal spot has moved in the time between calibration and image acquisition. If all individual x-ray sensors and/or detector elements were identical, they would react the same way to a dynamic misalignment, i.e. with the same bias. However, there are also unavoidable static misalignments of the x-ray sensor and/or detector elements stemming from, for instance, inaccuracies during mounting. Two different statically misaligned x-ray sensor and/or detector elements will react differently to the same dynamic misalignment due to the non-linear nature of x-ray attenuation. From this one can conclude that the resulting bias in the material basis pathlengths will be different. In third generation CT such differences, if large enough, will generate ring artifacts during reconstruction which is clinically intolerable in patient images.

Dynamic misalignment is therefore a real image quality problem and its effects are aggravated for systems using x-ray sensor and/or detector elements with large aspect ratio. The sources of dynamic misalignment are furthermore not simple to eliminate. For example, while the possible bending of the detector cradle during rotation is predictable and the effect is therefore possible to calibrate for, calibrating the system for all possible rotation speeds is very time consuming in practice. Similarly, even though thermal expansion (from heat generated by the detector modules during the scan) can be expected to behave predictable with temperature, calibration at all different possible detector temperatures (which depend on the ambient surrounding and the scan duration) is also not practical. Finally, dynamic focal spot motion, although efforts have been made to minimize it, is a technical reality in all x-ray tubes with rotating anode used in clinical practice.

This more detailed problem description has served to show that dynamic misalignment is a technical reality which is non-trivial to eliminate. The effects of dynamic misalignment may be clinically unacceptable image artifacts, especially for photon counting multi-bin detectors with large aspect ratio used for CT applications.

It is a general object to provide improvements related to x-ray detectors and/or x-ray imaging systems.

For example, it is desirable for an x-ray detector to be more robust to dynamic misalignment or to provide a technical solution that at least reduces the sensitivity to such dynamic misalignments.

It is a specific object to provide an edge-on x-ray detector configured for detecting incoming x-rays.

It is also an object to provide an x-ray imaging system comprising such an x-ray detector.

These and other objects may be achieved by one or more embodiments of the proposed technology.

According to a first aspect, there is provided an edge-on x-ray detector configured for detecting incoming x-rays. The edge-on x-ray detector comprises a plurality of adjacent x-ray sensors, wherein each x-ray sensor is oriented edge-on to incoming x-rays. The x-ray sensors are arranged side-by-side and/or lined up one after the other, and the interspacing between the x-ray sensors is at least partly filled with a gap filling material comprising a mixture or compound of resin and metal disulfide.

Figure 11:
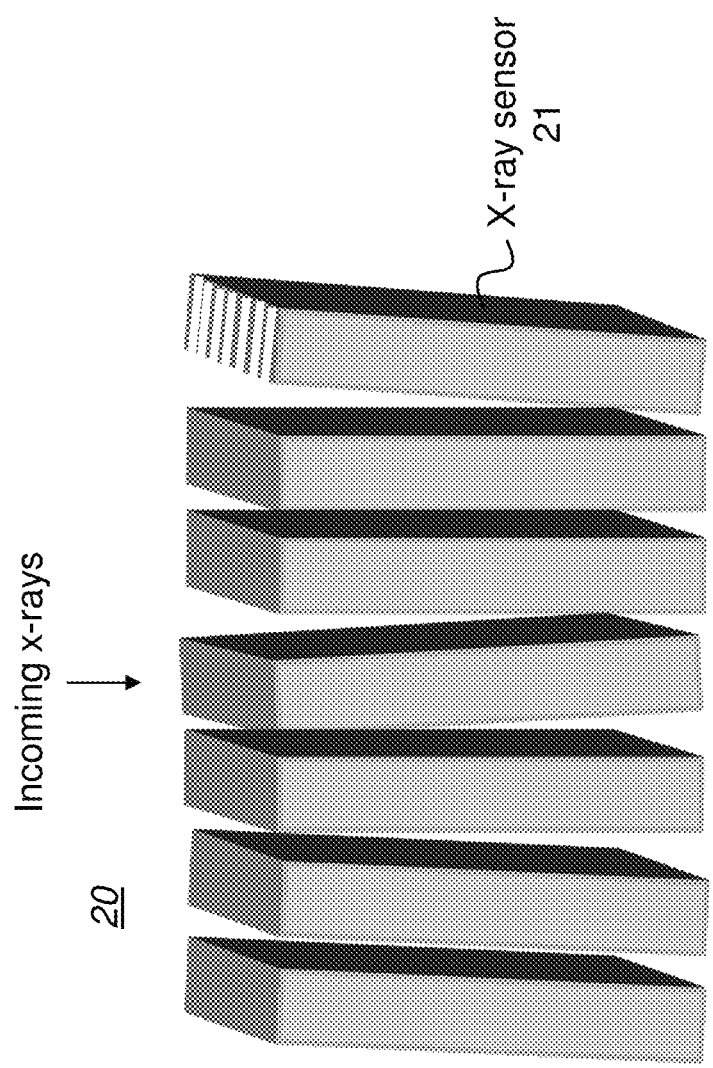
FIG. 11 is a schematic perspective diagram illustrating an example of an x-ray detector comprising a set of adjacent x-ray sensors arranged side-by-side and/or lined up one after the other.

FIG. 11 is a schematic perspective diagram illustrating an example of an x-ray detector 20 comprising a set of adjacent x-ray sensors 21 arranged side-by-side and/or lined up one after the other. As can be seen, the x-ray sensors are oriented edge-on to incoming x-rays.

Figure 12:
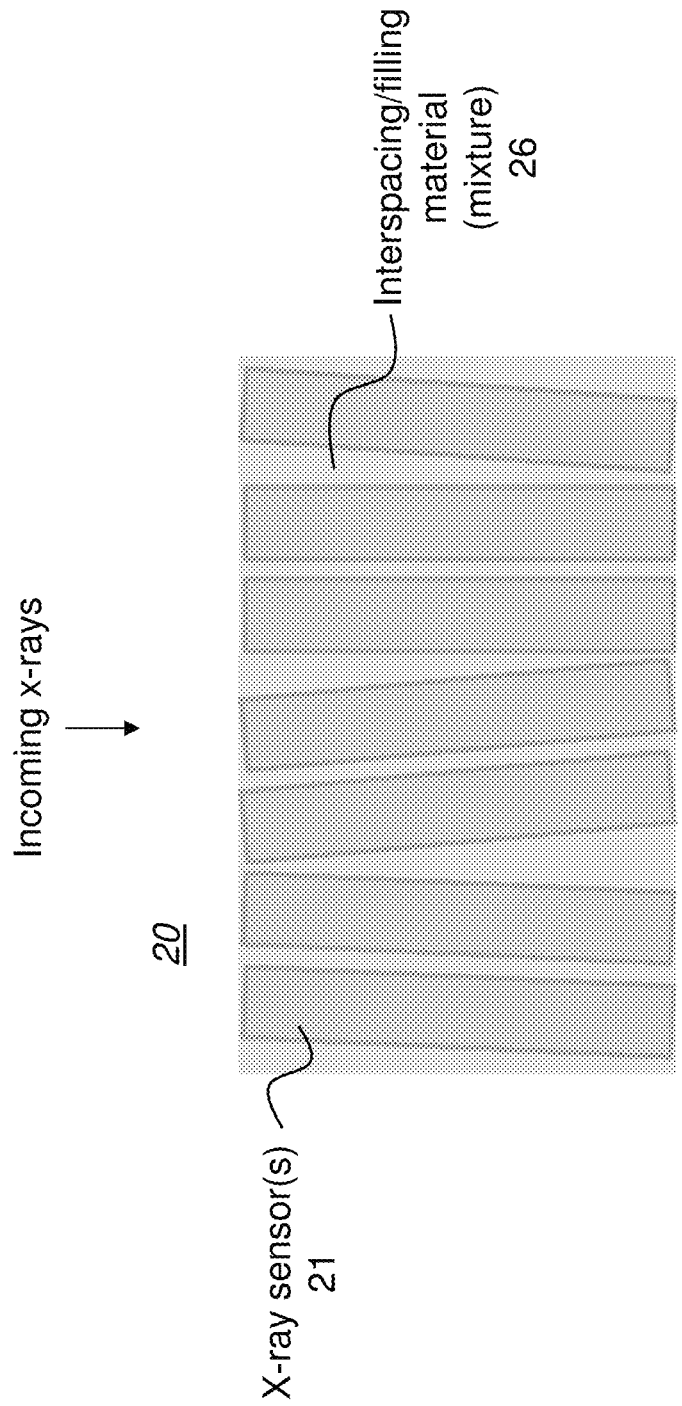
FIG. 12 is a schematic cross-section diagram illustrating an example of an x-ray detector comprising a set of adjacent x-ray sensors arranged side-by-side and/or lined up one after the other.

FIG. 12 is a schematic cross-section diagram illustrating an example of an x-ray detector 20 comprising a set of adjacent x-ray sensors 21 arranged side-by-side and/or lined up one after the other, wherein each x-ray sensor is oriented edge-on to incoming x-rays. The cross-section diagram of FIG. 12 also illustrates how the interspacing is at least partially filled with an interspacing/filling material 26. This material 26 comprises a mixture or compound of resin and metal disulfide.

Figure 13:
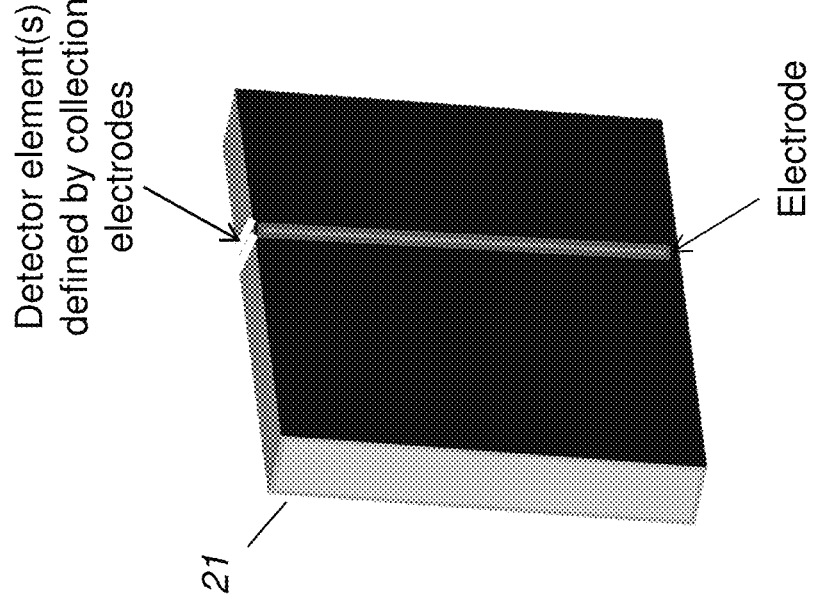
FIG. 13 is a schematic diagram illustrating an example of an x-ray sensor in which individual detector elements could be defined by charge collection electrodes on the back side.

FIG. 13 is a schematic diagram illustrating an example of an x-ray sensor in which individual detector elements could be defined by charge collection electrodes on the back side.

Typically, there is a desire for the x-ray sensors 21 to be close to each other to maximize the active detector area/volume and thus dose efficiency, but at the same time they should not be in direct physical contact with each other due to the apparent risk of short circuiting. From a manufacturing perspective, and since the aspect ratio of x-ray sensors 21 and/or the detector elements thereof is high, there is a need for some lateral support and interspacing and/or filling material between the x-ray sensors 21, e.g. to ensure a rigid structure and proper functionality. This interspacing and/or filling material could for example be based on a resin (such as glue or another adhesive, or in general, any organic or synthetic resin) which has the benefit of lending itself to automatic dispensing by an industrial robot as part of the manufacturing process, allowing for a streamlined production process.

Parasitic capacitance between the x-ray sensors and/or detector elements affects the electronic noise level and therefore the performance of the detector. This parasitic capacitance depends inversely on the distance separating two x-ray sensors and also depends on the permittivity (dielectric constant) of the material separating them. Accordingly, from a dose efficiency point of view one would want the x-ray sensors to be as close as possible and from a noise perspective one would want them to be further apart, to keep parasitic capacitance and thereby noise to a minimum.

It is beneficial for the gap filling material to have x-ray attenuating properties. For example, if it may be desirable to provide a mixture or compound that mimics the attenuation of silicon, especially if silicon-based x-ray sensors are used.

More generally, the invention proposes mixing an x-ray attenuating metal disulfide (e.g. in the form of a powder) into a resin to lower the sensitivity to dynamic misalignments.

In other words, the inventors have found that mixing metal disulfide into the resin provides a technical solution that supports useful properties and features as mentioned above, and as will be further elaborated on later on.

In this way, the edge-on x-ray detector may become more robust to dynamic misalignments. In particular, so-called high aspect ratio x-ray sensors and/or detector elements may be less sensitive to dynamic misalignments with respect to the focal point of the x-ray source. This in turn may lead to improved image quality. In particular, it may be possible to more or less eliminate certain image artefacts, e.g. in clinical CT applications.

Expressed slightly differently, the assembly process results in somewhat variable sensor-to-sensor and sensor-to-lamella distances (in the z-direction). If a standard glue is used (with a low average atomic number like epoxy) the x-ray attenuation of the glue-filled gaps in the assembly would be very low. This would make the design highly sensitive to dynamic focal spot movements (in the z-direction) since different sensors would react very differently. Spectral change induced by the focal spot shift. This would result in ring artefacts. By using a glue or resin mixture obtained by mixing tungsten disulfide (or any other metal powder with high atomic number) into the glue or resin at a concentration that makes the glue-gap appear as silicon-like as possible, the sensitivity to artefacts will be significantly reduced.

Figure 14B:
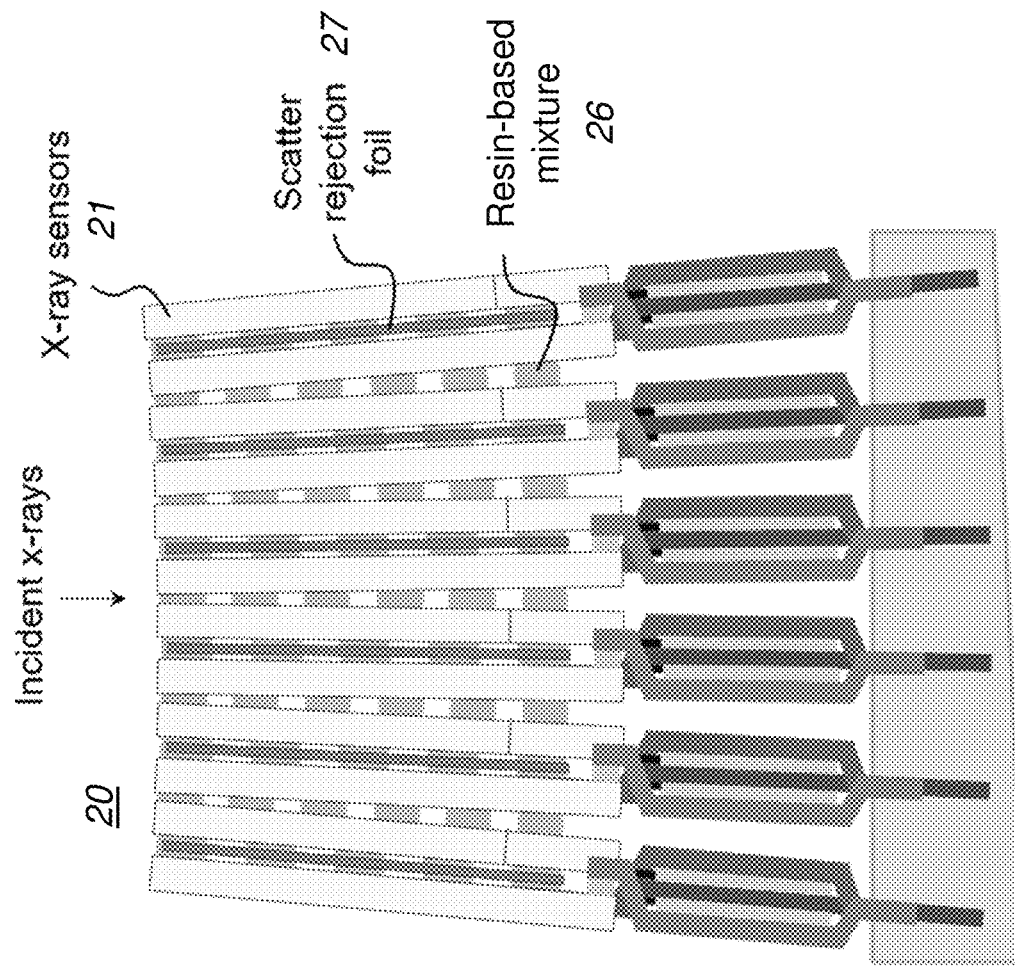
FIG. 14B is a schematic diagram illustrating an example of a particular implementation of an x-ray detector built from several detector modules of FIG. 14A.
Figure 14A:
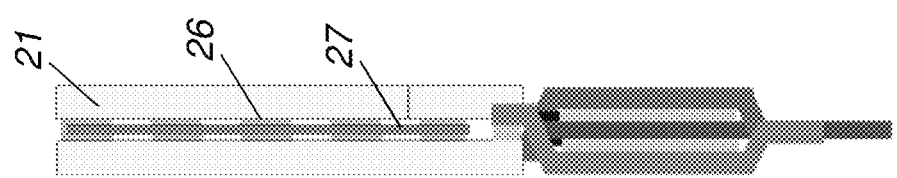
FIG. 14A is a schematic diagram illustrating an example of a particular implementation of a detector module based on two x-ray sensors.

FIG. 14A is a schematic diagram illustrating an example of a particular implementation of a detector module based on two x-ray sensors. In this example, the x-ray sensors 21 arranged side-by-side, having a scatter rejection foil or plate 27 located between the x-ray sensors. The gap between the x-ray sensors 21 is further at least partially filled with a material 26 based on a mixture or compound of resin and metal disulfide, a so-called resin-based mixture.

FIG. 14B is a schematic diagram illustrating an example of a particular implementation of an x-ray detector built from several detector modules of FIG. 14A. Here, it can be seen that the interspacing between detector modules is also at least partially filled with the resin-based mixture 26. It can also be seen that the x-ray sensors 21 (as well as the overall x-ray detector assembly or x-ray detector) is oriented edge on toward the incident x-rays, hence defining an edge-on x-ray detector 20.

By way of example, although various metal disulfides may be used, it has been shown that a beneficial choice of metal disulfide for the gap filling mixture or compound is tungsten disulfide. For example, the resin may be mixed with tungsten disulfide powder. Tungsten disulfide is an inorganic chemical compound composed of tungsten and sulfur with the chemical formula WS2 or WS2.

In a particular example, the product of the fill factor of the mixture and the weight fraction of tungsten disulfide in the mixture ranges between 5 and 15%.

More desirably, the product of the fill factor of the mixture and the weight fraction of tungsten disulfide in the mixture may be in the range between 6 and 12%.

In a further particular example, it has been shown that really satisfactory performance can be achieved when the product of the fill factor of the mixture and the weight fraction of tungsten disulfide in the mixture ranges between 8 and 10%.

By way of example, the fill factor of the mixture may be defined as the fraction of interspacing void between x-ray sensors occupied by the mixture.

As an example, the resin may be an organic or synthetic resin.

In a particular example, the resin may have adhesive properties, e.g. in the form of an adhesive and/or glue.

For example, the resin may include an adhesive based on epoxy, acrylate, silicon, polyvinyl acetate and/or urethane or polyurethane.

Optionally, the x-ray detector may further comprise scatter rejection foils or plates arranged between at least part of the x-ray sensors.

For example, these scatter rejection foils or plates may be made of tungsten.

By way of example, the x-ray sensors may be edge-on x-ray sensors, each having a number of detector elements, e.g. as illustrated in FIGS. 5-7.

In a particular example, each edge-on x-ray sensor is based on a silicon wafer having a number of detector electrodes.

As schematically illustrated, each edge-on x-ray sensor may include detector elements extending in the depth direction of the edge-on x-ray sensor, assuming x-rays enter through the edge.

In a particular example, each edge-on x-ray sensor is a depth-segmented x-ray sensor having two or more depth segments of detector elements in the direction of the incoming x-rays, e.g. see FIG. 6 or FIG. 7.

For example, the x-ray sensors may be arranged side-by-side and/or lined up one after the other in a direction substantially perpendicular to the direction of the incoming x-rays and/or arranged in a slightly curved overall configuration with respect to the x-ray focal point of an associated x-ray source.

As an example, the x-ray sensors may be planar modules, and, for at least part of the x-ray sensors, the x-ray sensors may be arranged side-by-side in the so-called in-plane direction of the x-ray sensors and/or in a direction transversely to the in-plane direction.

In a particular example, the edge-on x-ray detector may be a photon-counting x-ray detector, e.g. a photon-counting multi-bin x-ray detector.

The so-called resin-based mixture or compound having a metal disulfide mixed with resin can be applied on the surface of an x-ray sensor in many different ways, e.g. applied in strings or in a dot pattern on at least a subset of the adjacent x-ray sensors.

Figure 15A:
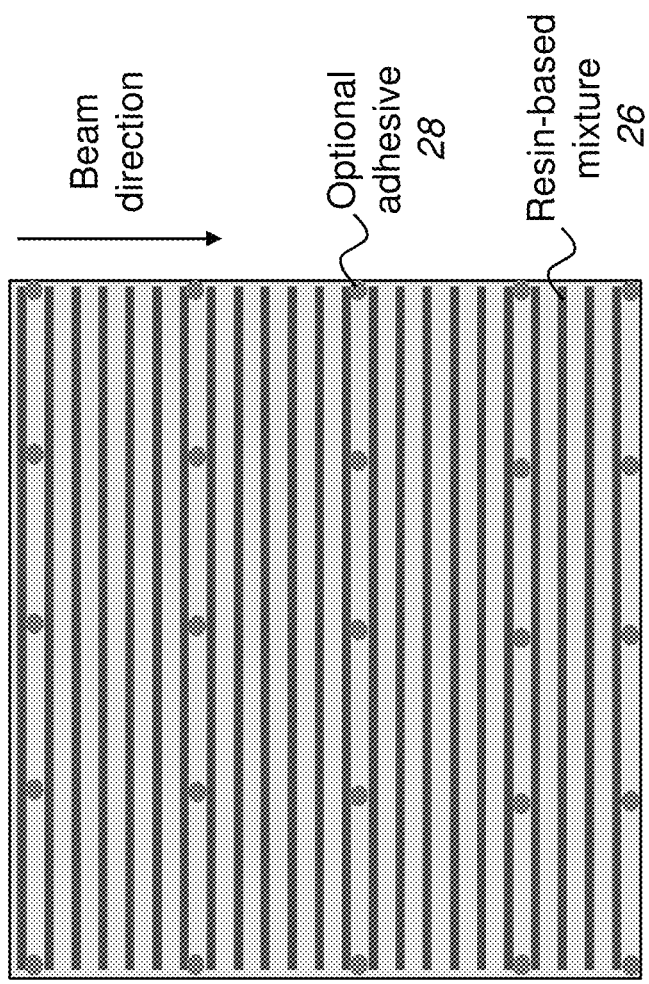
FIG. 15A is a schematic planar diagram illustrating an example of how the resin-based mixture or compound can be applied on the surface of an x-ray sensor.

FIG. 15A is a schematic planar diagram illustrating an example of how the resin-based mixture or compound can be applied on the surface of an x-ray sensor. In this example, the resin-based mixture with metal disulfide 26 is applied in strings on the planar surface of the x-ray sensor substrate. Optionally, an additional adhesive 28 may be applied, preferably in dots to lock and/or strengthen the connection and rigidity between adjacent x-ray sensors. This optional adhesive 28 may for example be a UV and/or heat cured adhesive.

Figure 15B:
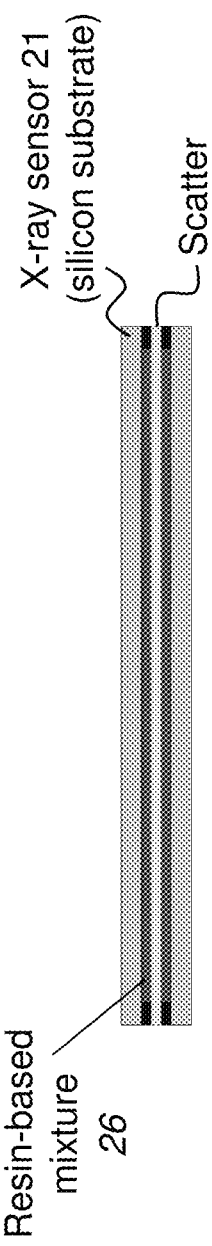
FIG. 15B is a schematic cross-section diagram illustrating an example of a detector module based on two x-ray sensors having a scatter rejection foil arranged in-between and with a gap filling material comprising a resin-based mixture or compound of the present invention.

FIG. 15B is a schematic cross-section diagram illustrating an example of a detector module based on two x-ray sensors having a scatter rejection foil arranged in-between and with a gap filling material comprising a resin-based mixture or compound of the present invention.

Figure 16:
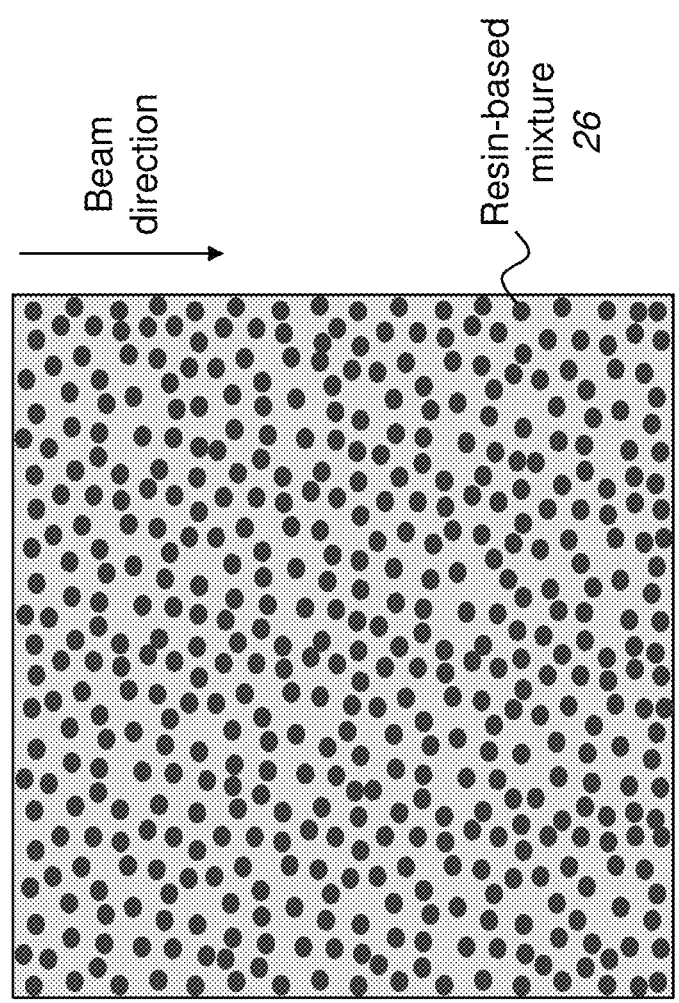
FIG. 16 is a schematic planar diagram illustrating another example of how the resin-based mixture or compound can be applied on the surface of an x-ray sensor.

FIG. 16 is a schematic planar diagram illustrating another example of how the resin-based mixture or compound can be applied on the surface of an x-ray sensor.

As previously mentioned, parasitic capacitance between the x-ray sensors and/or detector elements affects the electronic noise level and therefore the performance of the detector. This parasitic capacitance depends inversely on the distance separating two x-ray sensors and also depends on the permittivity (dielectric constant) of the material separating them. Accordingly, from a dose efficiency point of view one would want the x-ray sensors to be as close as possible and from a noise perspective one would want them to be further apart, to keep parasitic capacitance and thereby noise to a minimum.

Figure 17:
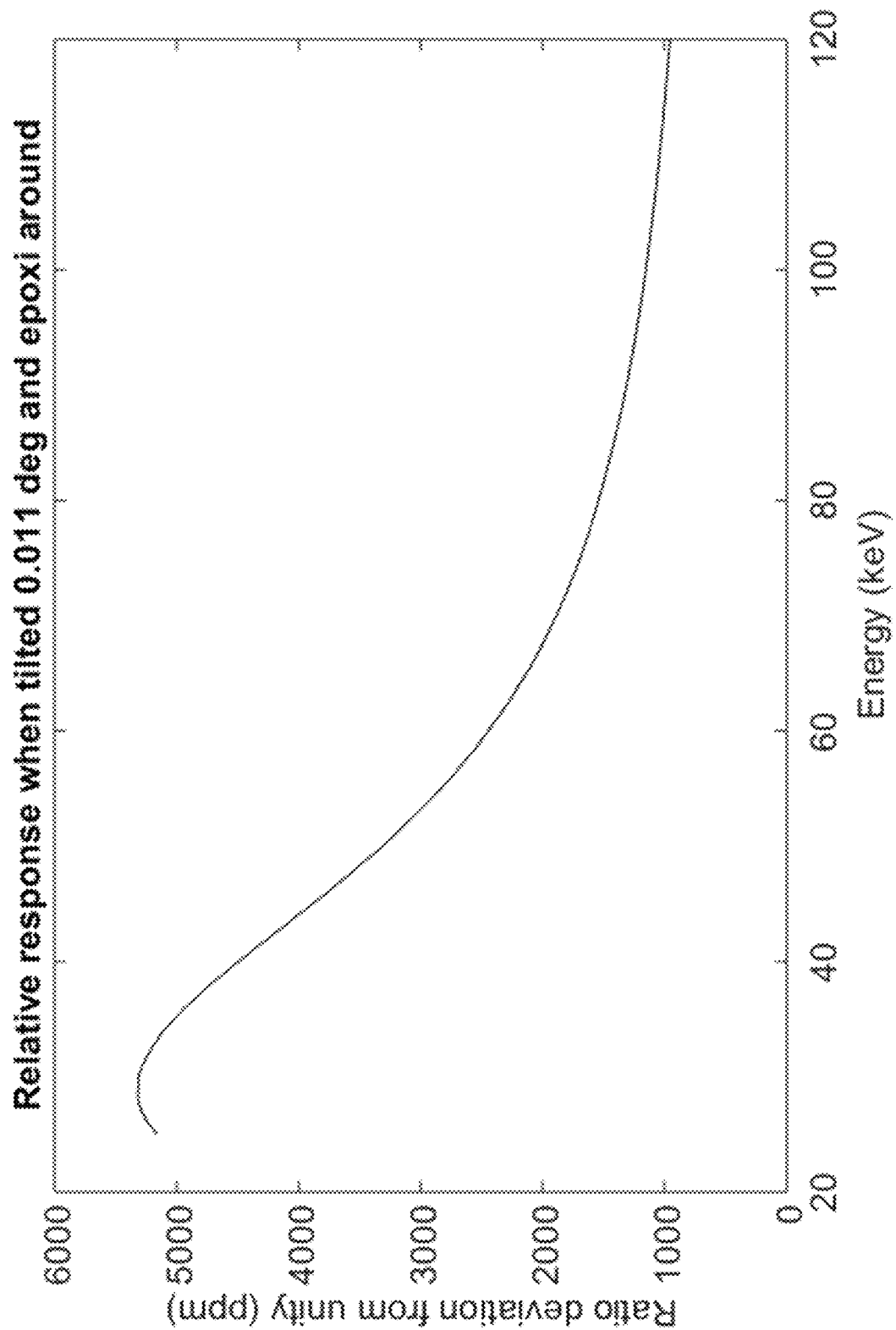
FIG. 17 is a schematic curve diagram illustrating an example of the relative difference as a function of energy for a misaligned case where simply an epoxy glue is used in the interspacing between x-ray sensors.

Most resins and/or glues have relatively low average atomic number and are therefore, in terms of the x-ray linear attenuation coefficients, quite similar to air. As described above, this results in a sensitivity to dynamic misalignments between the detector element axes and the focal spot. This is illustrated in FIG. 17, where a simulation is carried out for a silicon strip detector with a large aspect ratio of 57. To make the simulation more realistic, the dynamic misalignment corresponds to a dynamic focal spot movement of 0.2 mm. Given an assumed source-to-detector distance of 1 m, this corresponds to a dynamic misalignment of 0.0115° ($\tan^{-1}(a2/1000)$).

In this example, the void between the x-ray sensors and/or detector elements is assumed to be filled hardened epoxy glue. In total, 0.14% more photons interact in the detector (compared to the non-misaligned case) and the ratio of the photon energies is shown in FIG. 17. From FIG. 17 it can be seen that, for example, a movement of the focal spot of 0.2 mm will result in 2000 ppm more photons in the energy range 60-70 keV interacting in the detector and that the difference increases the lower the energy.

The figures 2000 ppm and 0.14% might appear small but for detectors used for third generation CT, this will unfortunately result in visible ring artifacts.

It is desirable, e.g. for a CT detector assembly to be robust to dynamic misalignment.

As already outlined above, the invention proposes mixing an x-ray attenuating metal disulfide (e.g. in the form of a powder) into a resin such as epoxy glue to lower the sensitivity to dynamic misalignments.

As a basis for discussing implementation details, the metal powder and its concentration should preferably be selected both to minimize the spectral sensitivity of the detector assembly to dynamic misalignments and to keep parasitic capacitance between x-ray sensors and/or detector elements to a minimum. At the same time desired characteristics of the resin (such as epoxy glue), i.e. non-granularity and a viscosity that allows it to be automatically dispensed, should preferably be maintained.

For example, mixing molybdenum disulfide in the resin might result in desirable x-ray attenuation properties but require a high mass fraction, due to the relative low atomic number of molybdenum. In some cases, the mixing itself may become difficult or the resin-powder mixture may become too viscous. This might be the case particularly if the interspacing between x-ray sensors and/or detector elements is not completely filled with the resin-based mixture or compound, for instance if the resin is dispensed in lines with a fill factor less than unity. In such a case, the weight fraction of the power must be correspondingly larger to yield a similar attenuation. Using a fill factor less than unity is desirable to keep parasitic capacitance to a minimum. The resin-based mixture must furthermore not be electrically conductive as this would lead to short circuiting of the detector elements. This makes the use of industrially available glues that have been made conductive by addition of metal grains unfeasible.

It may be more advantageous to use a metal disulfide such as tungsten disulfide (WS2), rather than molybdenum disulfide. Selecting tungsten disulfide instead of molybdenum disulfide as a powder to mix into the resin or glue allow a small fraction by weight, owing to the higher atomic number, overcoming the practical problem of obtaining a lumpy non-viscous mixture. WS2 also has low permittivity keeping parasitic capacitance low and allowing the x-ray sensor spacing to be small.

Figure 18:
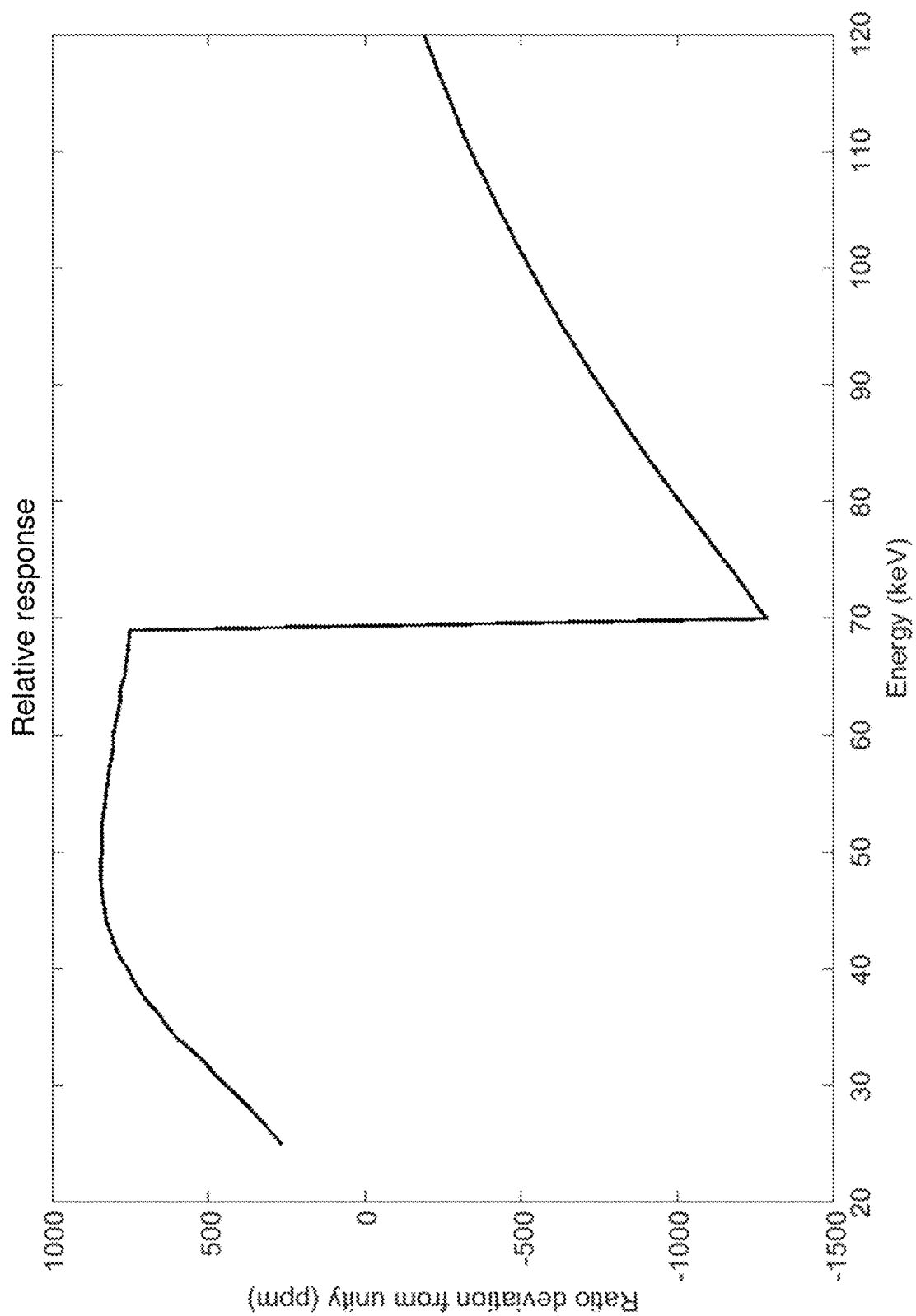
FIG. 18 is a schematic curve diagram illustrating a first example of the relative difference as a function of energy for a misaligned case where a material comprising a mixture or compound of an expoy resin and tungsten disulfide is used in the interspacing between x-ray sensors.

The spectral sensitivity to dynamic misalignment is however sensitive to concentration. For example, using the same simulation parameters as above, and adding 13% WS2 by weight to a resin such as epoxy glue, results in a change of 500 ppm in total counts and an energy distribution like in FIG. 18.

Figure 19:
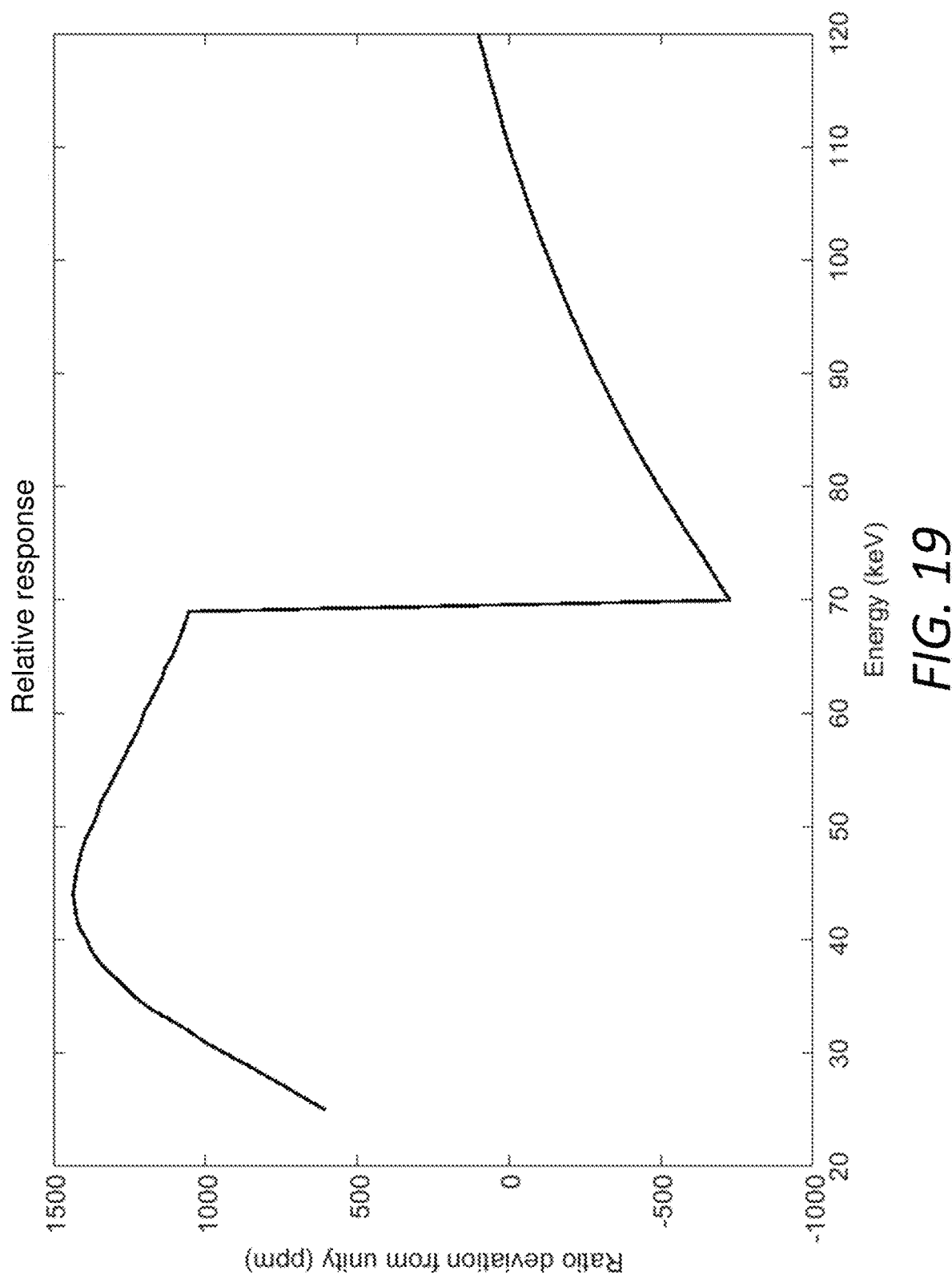
FIG. 19 is a schematic curve diagram illustrating a second example of the relative difference as a function of energy for a misaligned case where a material comprising a mixture or compound of an expoy resin and tungsten disulfide is used in the interspacing between x-ray sensors.

If 9.5% WS2 by weight is added to the resin such as epoxy glue, the total number detected photons, regardless of energy, will differ a mere 60 ppm when 0.0115° misaligned compared to the non-misaligned case. This effect is negligible. FIG. 19 shows that, for the most prominent x-ray energies of the spectrum 80-100 keV, the resulting difference from the 0.0115° misalignment is in the order of hundreds of parts per million (ppm). This is a level that is tolerable in third generation CT and will in general not result in ring artifacts.

This shows that with careful considerations, a so-called high aspect ratio x-ray detector can be made more or less insensitive to dynamic misalignments using the proposed method.

According to a second aspect, there is provided an x-ray imaging system including such an edge-on x-ray detector.

Expressed slightly differently, according to a third aspect, the proposed technology provides an edge-on x-ray detector configured for detecting incoming x-rays, which comprises a plurality of adjacent x-ray detector sub-modules, wherein each x-ray detector sub-module is oriented edge-on to incoming x-rays. The x-ray detector sub-modules are arranged side-by-side and/or lined up one after the other, and the interspacing between the x-ray detector sub-modules is at least partly filled with a material comprising a metal disulfide mixed into a synthetic or organic resin or compound.

It will be appreciated that the methods and devices described herein can be combined and re-arranged in a variety of ways.

For example, specific functions may be implemented in hardware, or in software for execution by suitable processing circuitry, or a combination thereof.

The steps, functions, procedures, modules and/or blocks described herein may be implemented in hardware using any conventional technology, such as semiconductor technology, discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

FIG. 20 is a schematic diagram illustrating an example of a computer implementation according to an embodiment. In this particular example, the system 200 comprises a processor 210 and a memory 220, the memory comprising instructions executable by the processor, whereby the processor is operative to perform the steps and/or actions described herein. The instructions are typically organized as a computer program 225; 235, which may be preconfigured in the memory 220 or downloaded from an external memory device 230. Optionally, the system 200 comprises an input/output interface 240 that may be interconnected to the processor(s) 210 and/or the memory 220 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The proposed technology also provides a computer-program product comprising a computer-readable medium 220; 230 having stored thereon such a computer program.

By way of example, the software or computer program 225; 235 may be realized as a computer program product, which is normally carried or stored on a computer-readable medium 220; 230, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Method flows may be regarded as a computer action flows, when performed by one or more processors. A corresponding device, system and/or apparatus may be defined as a group of function modules, where each step performed by the processor corresponds to a function module. In this case, the function modules are implemented as a computer program running on the processor. Hence, the device, system and/or apparatus may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein.

Alternatively, it is possibly to realize the modules predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. An edge-on x-ray detector configured to detect incoming x-rays, said edge-on x-ray detector comprising:
a plurality of adjacent x-ray sensors, each of the x-ray sensors being oriented edge-on to incoming x-rays, the x-ray sensors being disposed side-by-side and/or lined up one after the other, interspacing between the x-ray sensors being at least partly filled with a gap-filling material comprising a mixture or compound of resin and x-ray attenuating metal disulfide powder to mitigate effects of dynamic misalignments.

2. The edge-on x-ray detector of claim 1, wherein the metal disulfide is tungsten disulfide.

3. The edge-on x-ray detector of claim 1, wherein the resin is mixed with tungsten disulfide powder.

4. The edge-on x-ray detector of claim 1, wherein the resin is an organic or synthetic resin.

5. The edge-on x-ray detector of claim 1, wherein the resin has adhesive properties.

6. The edge-on x-ray detector of claim 1, wherein the resin includes an adhesive based on one or more of epoxy, acrylate, silicon, polyvinyl acetate, and urethane or polyurethane.

7. The edge-on x-ray detector of claim 1, further comprising scatter rejection foils or plates disposed between at least part of the x-ray sensors.

8. The edge-on x-ray detector of claim 7, wherein the scatter rejection foils or plates are made of tungsten.

9. The edge-on x-ray detector of claim 1, wherein the x-ray sensors are edge-on x-ray sensors, each of the edge-on x-ray sensors having a plurality of detector elements.

10. The edge-on x-ray detector of claim 9, wherein each of the edge-on x-ray sensors is based on a silicon wafer having a plurality of detector electrodes.

11. The edge-on x-ray detector of claim 9, wherein each of the edge-on x-ray sensors comprises detector elements extending in the depth direction of the respective edge-on x-ray sensor, assuming x-rays enter through the edge.

12. The edge-on x-ray detector of claim 9, wherein each of the edge-on x-ray sensors is a depth-segmented x-ray sensor having two or more depth segments of detector elements in the direction of the incoming x-rays.

13. The edge-on x-ray detector of claim 1, wherein the x-ray sensors are one or more of: (i) disposed side-by-side and/or lined up one after the other in a direction substantially perpendicular to the direction of the incoming x-rays, and (ii) disposed in a slightly curved overall configuration with respect to the x-ray focal point of an associated x-ray source.

14. The edge-on x-ray detector of claim 1, wherein the x-ray sensors are planar modules, and
for at least part of the x-ray sensors, the x-ray sensors are disposed side-by-side in the in-plane direction of the x-ray sensors and/or in a direction transversely to the in-plane direction.

15. The edge-on x-ray detector of claim 1, wherein the edge-on x-ray detector is a photon-counting x-ray detector.

16. The edge-on x-ray detector of claim 1, wherein the gap-filling material comprising the mixture or compound of the resin and the x-ray attenuating metal disulfide powder is applied in strings or in a dot pattern on at least a subset of the adjacent x-ray sensors.

17. An x-ray imaging system comprising:
the edge-on x-ray detector of claim 1.

18. The edge-on x-ray detector of claim 1, wherein the dynamic misalignments are misalignments of one or more of the x-ray sensors with respect to the focal spot of an associated x-ray source.

* * * * *